US009591043B2

(12) United States Patent
McCaffer et al.

(10) Patent No.: US 9,591,043 B2
(45) Date of Patent: Mar. 7, 2017

(54) COMPUTER-IMPLEMENTED METHOD, COMPUTER SYSTEM, AND COMPUTER PROGRAM PRODUCT FOR SYNCHRONIZING OUTPUT OF MEDIA DATA ACROSS A PLURALITY OF DEVICES

(71) Applicant: Accenture Global Services Limited, Dublin (IE)

(72) Inventors: Andrew McCaffer, London (GB); Stephen Andrew Hatch, Berkshire (GB); Paul Delaney, Balmain (AU); Christopher Lemire, Flemington, NJ (US)

(73) Assignee: Accenture Global Services Limited, Dublin (IE)

( * ) Notice: Subject to any disclaimer, the term of this patent is extended or adjusted under 35 U.S.C. 154(b) by 192 days.

(21) Appl. No.: 13/675,846

(22) Filed: Nov. 13, 2012

(65) Prior Publication Data

US 2013/0138778 A1    May 30, 2013

(30) Foreign Application Priority Data

Nov. 14, 2011  (EP) .................................... 11009014

(51) Int. Cl.
*G06F 15/16*   (2006.01)
*H04L 29/06*   (2006.01)
(Continued)

(52) U.S. Cl.
CPC ......... *H04L 65/60* (2013.01); *H04N 21/2381* (2013.01); *H04N 21/242* (2013.01)

(58) Field of Classification Search
CPC . H04L 65/4076; H04L 65/60; H04L 12/1827; H04N 21/242; H04N 21/4305;
(Continued)

(56) References Cited

U.S. PATENT DOCUMENTS 6,385,198 B1 *  5/2002  Ofek et al. .................... 370/389
6,625,743 B1 *  9/2003  Gulick ...................... G06F 1/12
                                                       710/5

(Continued)

FOREIGN PATENT DOCUMENTS

CN         1692350 A    11/2005
CN       101272200 A     9/2008
(Continued)

OTHER PUBLICATIONS

European Search Report issued in related European Application No. 11009014.9-1247 on May 11, 2012.
(Continued)

*Primary Examiner* — Dustin Nguyen
(74) *Attorney, Agent, or Firm* — Brinks Gilson & Lione

(57) ABSTRACT

A computer-implemented method, a computer system, and a computer program product for synchronizing output of media data across a plurality of devices is provided. The computer-implemented method for synchronizing output of media data across a plurality of output devices may include providing a communication network between a media server and a plurality of output devices; and synchronously outputting media data files on the plurality of output devices, wherein the media data files are transmitted to the output devices from the media server in form of a data stream over different delivery networks.

15 Claims, 4 Drawing Sheets

(51) Int. Cl.
*H04N 21/2381* (2011.01)
*H04N 21/242* (2011.01)

(58) Field of Classification Search
CPC ...... H04N 7/147; H04N 21/2402; G06F 1/12; G06F 3/14
USPC ......... 381/80; 715/500.1; 370/389; 709/231; 725/81, 93; 345/213, 536
See application file for complete search history.

(56) References Cited

U.S. PATENT DOCUMENTS

| | | | |
|---|---|---|---|
| 7,710,941 B2 | 5/2010 | Rietschel et al. | |
| 8,514,705 B2* | 8/2013 | Niamut et al. | 370/231 |
| 8,766,993 B1* | 7/2014 | Hobbs | G06F 3/14 345/536 |
| 8,839,340 B2* | 9/2014 | Van Deventer et al. | 725/149 |
| 2002/0112244 A1* | 8/2002 | Liou | H04L 12/1827 725/93 |
| 2004/0141731 A1 | 7/2004 | Ishioka et al. | |
| 2004/0156624 A1 | 8/2004 | Kent, Jr. et al. | |
| 2006/0002681 A1* | 1/2006 | Spilo et al. | 386/46 |
| 2006/0085823 A1* | 4/2006 | Bell | H04N 7/147 725/81 |
| 2007/0094405 A1 | 4/2007 | Zhang | |
| 2007/0107032 A1* | 5/2007 | Rachamadugu | 725/114 |
| 2007/0250761 A1* | 10/2007 | Bradley et al. | 715/500.1 |
| 2008/0079658 A1 | 4/2008 | Naito et al. | |
| 2011/0043514 A1* | 2/2011 | Hussain | G09G 5/18 345/213 |
| 2012/0230510 A1* | 9/2012 | Dinescu et al. | 381/80 |
| 2012/0284419 A1* | 11/2012 | Brenes | H04N 21/2402 709/231 |
| 2014/0095652 A1* | 4/2014 | Bichot et al. | 709/217 |

FOREIGN PATENT DOCUMENTS

| | | |
|---|---|---|
| CN | 101288257 A | 10/2008 |
| CN | 101587431 A | 11/2009 |
| CN | 102065340 A | 5/2011 |

OTHER PUBLICATIONS

Fernando Boronat Segui, Juan Carlos Guerri Cebollada, & Jaime Lloret Mauri, "An RTP/RTCP based approach for multimedia group and inter-stream synchronization", Multimedia Tools and Applications, Jun. 25, 2008, pp. 285-319, vol. 40. No. 2, Springer Netherlands, Published Online.

Fernando Boronat, Jaime Lloret, & Miguel Garcia, "Multimedia group and inter-stream synchronization techniques: A comparative study", Information Systems, Mar. 1, 2009, pp. 108-131, vol. 34, No. 1, Pergamon Press, Oxford, GB.

Kurt Rothermel & Tobias Helbig, "An Adaptive Stream Synchronization Protocol", Proceedings of the 5th International Workshop on Network and Operating Systems Support for Digital Audio and Video, Durham, NH, Apr. 18, 1995, pp. 189-201, Springer, U.S.

Yutaka Ishibashi & Shuji Tasaka, "A Synchronization Mechanism for Continuous Media in Multimedia Communications", Proceedings IEEE INFOCOM 1995, the 14th Annual Joint Conference of the IEEE Computer and Communications Societies, Boston, MA, Apr. 2-6, 1995, pp. 1010-1019, vol. 3, IEEE Comp. Soc. Press., Los Alamitos, California.

Boronat Segui, F., "An RTP/RTCP Based Approach for Multimedia Group and Inter-Stream Synchronization," *Multimed Tools Appl.* vol. 40, (2008), pp. 285-319.

1st Office Action and Search Report to Chinese Application No. 2012105957689, dated Aug. 31, 2016, (6p).

* cited by examiner

COMPUTER-IMPLEMENTED METHOD, COMPUTER SYSTEM, AND COMPUTER PROGRAM PRODUCT FOR SYNCHRONIZING OUTPUT OF MEDIA DATA ACROSS A PLURALITY OF DEVICES

CLAIM OF PRIORITY

This application claims priority under 35 U.S.C. §119 to European Patent Application No. 11 009 014.9 filed Nov. 14, 2011, the entire contents of which are incorporated herein by reference.

TECHNICAL FIELD

This disclosure is directed generally to integration and distribution of media data such as video data, audio data, and/or text data and, in particular, to a computer-implemented method, a computer system, and a computer program product for synchronizing output of media data across a plurality of devices.

BACKGROUND

It is becoming more and more of interest to distribute (multi-)media data such as text data, audio data, and/or video data from a central unit such as a media server to a plurality of different output devices such as tablet style personal computers, smart phones, televisions, and/or laptop style personal computers. Further, the media data may be delivered to the output devices over different delivery networks such as pure media data in HDMI, streamed media data over a fixed wired Ethernet network, and/or over a wireless IP network. For example, video data shall be displayed through a central unit on such output devices on a periodical basis (e.g. weekly, monthly, daily, etc.). Consequently, the media data need to be synchronized between the central unit and each of the output devices. Distribution and/or synchronization of media data in a multi-user device environment become more and more of interest.

However, often problems arise when distributing and/or integrating media data with a central unit to a plurality of different output devices. For example, in most cases the media data is not synchronized across or between the different output devices. Furthermore, systems such as a central unit of distributing media data to a plurality of different output devices usually do not automatically re-synchronize the media data on the different output devices when the media data stream is stopped for some reason.

In view of the above, it would be challenging to distribute media data from a central unit such as a media server to a plurality of possibly distributed (local) devices over different delivery networks without the need for a (local) user to intervene so that media data is automatically synchronized and/or re-synchronized between a plurality of output devices with the central unit.

It is also not possible to manage and/or monitor media data centrally by controlling a single central unit connected to local output devices, wherein the media data may be transcoded and/or distributed in different formats.

Hence, there is a need to provide systems and methods for distributing and/or integrating media data to a plurality of output devices wherein a (re-) synchronization of the media data across (or between or among) a plurality of different output devices with a central unit can be automatically guaranteed.

SUMMARY

According to one general aspect a computer-implemented method for synchronizing output of media data across a plurality of output devices is provided. The method may include providing a communication network between a media server and a plurality of different output devices; and synchronously outputting media data files on the plurality of different output devices, wherein the media data files are transmitted to the output devices from the media server in form of a data stream over different delivery networks.

Basically, an end-to-end solution is provided in a technical process to ingest and transcode media data (e.g. video data, text data, audio data, etc.) and to centrally manage and/or monitor the media data that has been distributed from a media server to a plurality of output devices such as tablet style personal computers, smart phones, televisions, and/or laptop style personal computers. The media data distributed across the multiple output devices is output (e.g. played) in different formats, for example through combined use of uni-cast, heartbeat, and/or multi-cast technologies.

According to another aspect, synchronously outputting the media data files may include outputting the media data files at the same frame and at the same time on each of the output devices.

According to yet another aspect, a synchronization time with the media server may be maintained by each of the plurality of output devices by using the Network Time Protocol of the communication network.

According to yet another aspect, a Synchronous Stream Protocol (SSP) algorithm may be incorporated into the communication network.

According to yet another aspect, the data stream of the media server may be operable to send out a UDP (User Datagram Protocol) message to each of the output devices when the data stream enters into an adaptive mode.

An adaptive mode may relate to adaptive media (e.g. video) streaming technology whereby multiple streams of media (e.g. video) data is provided at varying bits rates to accommodate network and device performance. Hence, sending a UDP message to address synchronization when a data stream enters into an adaptive mode may include that the UDP packet sent with the UDP message will be sent whenever the stream is switched.

According to yet another aspect, each of the output devices is operable to adjust a playback speed and/or to skip to a particular time in the data stream based on information received with the UDP message from the media server.

Information that is received with a UDP packet of the UDP message to allow media data to speed or skip would and/or could include a frame count of the media data (e.g. each output device should be on frame 5674) and/or an actual media data time code (e.g., each output device should be play the media data at a time code 12:33:34:21). The time code can be specified using SMPTE timecode. SMPTE timecode relates to a set of cooperating standards to label individual frames of media data, in particular, video and/or film data with a time code. SMPTE is defined by the Society of Motion Picture and Television Engineers in the SMPTE 12M specification.

According to yet another aspect, synchronously outputting the media data files may include communicating a target media time and a media position to each of the plurality of output devices, wherein the adaptive mode determines the target media time at a time point beyond a network transmission time and the media position in the communication network.

A target media time may relate to a future time that is deliver by the adaptive mode, whereby, a start of an event such as the top of the hour, the beginning of a new media event, and/or the insertion of a commercial would trigger a time synchronization.

According to another general aspect, a computer system for synchronizing media data across a plurality of output devices is provided. The computer system may include a media server, a plurality of different output devices; and a communication network between the media server and the plurality of different output devices, wherein media data files are synchronously outputted on the plurality of different output devices, the media data files being transmitted to the output devices from the media server in form of a data stream over different delivery networks.

According to yet another aspect, the computer system is operable to perform a method as described.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
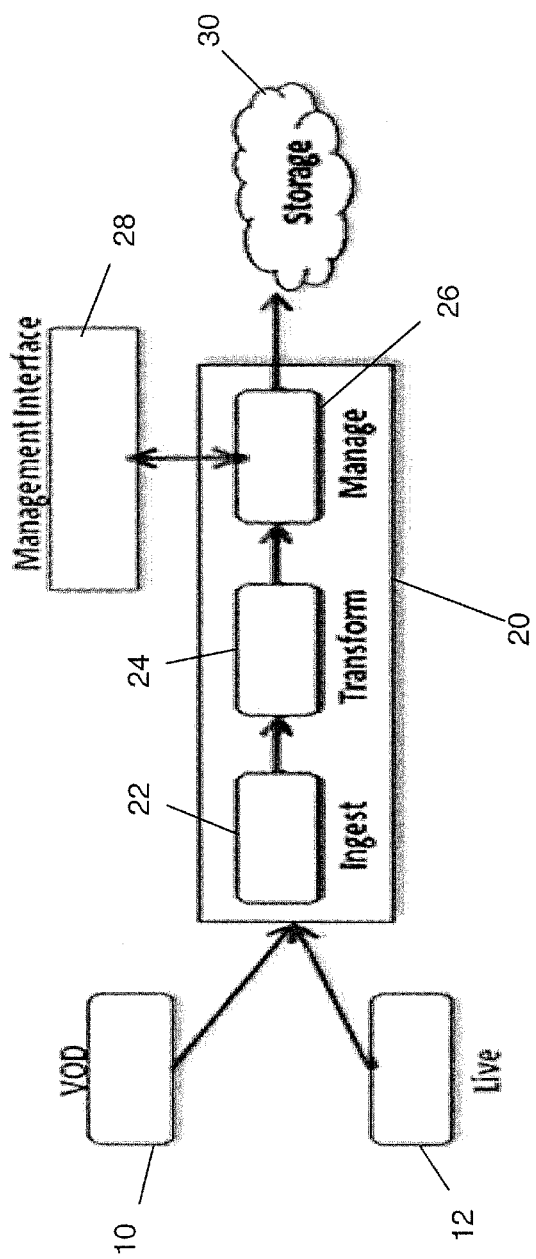
FIG. 1 shows an exemplary content management system for retrieving and storing media data.

FIG. 1 shows an exemplary system for integrating media data such as audio data, video data, and/or text data from different sources in a central system for storing and/or managing the integrated media data for further use. The system may include a content management system 20 for managing, storing, and/or distributing media data.

The media data integrated at the system shown in FIG. 1 may be used for distribution of the media data across a plurality of different and/or distributed output devices such as tablet style personal computers, smart phones, televisions, laptop style personal computers, etc. The media data may be distributed to the different output devices over different delivery networks such as pure media data in HDMI, streamed media data over a fixed wired Ethernet network, and/or over a wireless IP network. The media data which is formatted and stored at the content management system may be stored in terms of media data files which can be distributed and/or transmitted over different delivery networks to different output devices in the form of a data stream.

Distribution of the integrated media data from a media server having access to the system of FIG. 1 to a plurality of output devices is described below with reference to FIG. 2.

The system shown in FIG. 1 basically includes a content management system 20 for managing media data such as video data, audio data, and/or text data. The content management system 20 is a system providing a collection of procedures used to manage data flow in a collaborative environment. The content management system 20 may provide functioning for retrieving, converting, storing, controlling, semantically enriching, and/or distributing media data.

Media data is electronically received from a media data delivery entity 10, 12 at the content management system 20. The media data delivery entity 10, 12, which is also referred to as an entity, may be a video-on-demand (VOD) system 10 and/or a live media data stream 12.

The content management system 20 may include an ingest component 22, a transforming component 24, and/or a management component 26. The management component 26 may be coupled to a management interface 28. The content management system 20 may be further connected to a storage device 30 such as a database for storing media data manipulated by the content management system 20 in the form of media data files.

After the media data is received from the entity 10, 12 at the content management system 20, the media data is then transcoded into appropriate formats for output to different devices and stored in the form of media data files in the storage device 30 and may also be distributed to different systems and/or media servers. Distribution of the stored media data files may be performed in the form of a data stream.

The entity 10, 12 is operable to upload media data to the content management system 20. Access rights for uploading media data to the content management system 20 may be managed by a party owning and/or surveying the content management system 20. The uploaded media data may be further authorized by the party operating the content management system 20.

The media data uploaded at the content management system 20 from the entity 10, 12 may be feed to the ingest component 22 of the content management system. The ingest component 22 may include functionality to retrieve and transfer media data received from the entity 10, 12 to a digital editing and/or storage system. The ingest component 22 may digitize the signal of the incoming media data, compress an incoming media data stream to reduce the amount of data to be stored, and/or storing the digitized and/or compressed media data in media data files. Further, additional data may be added to the media data files such as file program identifiers and/or time stamps. In other words, the ingest component provides functionality to retrieve media data which is received in different formats for recording in media data files onto a hard disk recorder, for example.

Once media data (or a media data file) is uploaded and/or a media data stream is feed to the ingest component 22, the media data file received from the ingest component is transcoded and/or transformed at a transformer component 24 into media data appropriate to be output (e.g. displayed) on a media player, for example.

The content management system 20 may further include a management component 26 and/or a corresponding management interface 28 for managing the uploaded media data files and/or streams. The management component 26 may be operable to schedule media data files and/or may be operable to schedule delivery of media data files through a media player with respect to a play list. The management component 26 monitors information on media data files and/or related play lists through the management interface 28. The management component 26 may be further operable to store the retrieve and/or uploaded media data files in a storage device 30.

The management interface 28 may be a web-based interface. A media data file uploaded and/or a media data stream feed to the content management system 20 may be output (e.g. displayed) through the management interface 28 to a media player and/or a media server. For example, outputting media data files to a media server and/or to a media player through the management interface 28 may include displaying a media data file in green indicating that the file is active, displaying a media data file in amber indicating that the file is out of date, and/or displaying a media data file in red indicating that the media data file is down, i.e. no longer scheduled in a play list managed by the management component 26. In this way, a media file that has been requested by a server distributing media data from the content management system 20 can be confirmed.

Further, a process feedback confirming that a media file selected for delivery by a system has in fact been delivered may be provided at the management component 26. The system receiving the data may acknowledge recipient through the management interface 28.

The management component 26 may further include a service providing an email update through the management interface 28 to a party running the content management system 20 informing the party that a media data file upload is delivered to a server such as a media server at a specific time point with or without an error. This enables the party running the content management system 20 to be updated without logging onto the content management system 20.

Further, there may be placed and/or provided a reflector with a media server retrieving media data from the content management system 20. The reflector may allow single copies of each of the necessary versions of media data files to be delivered to the media server via the content management system 20.

Figure 2:
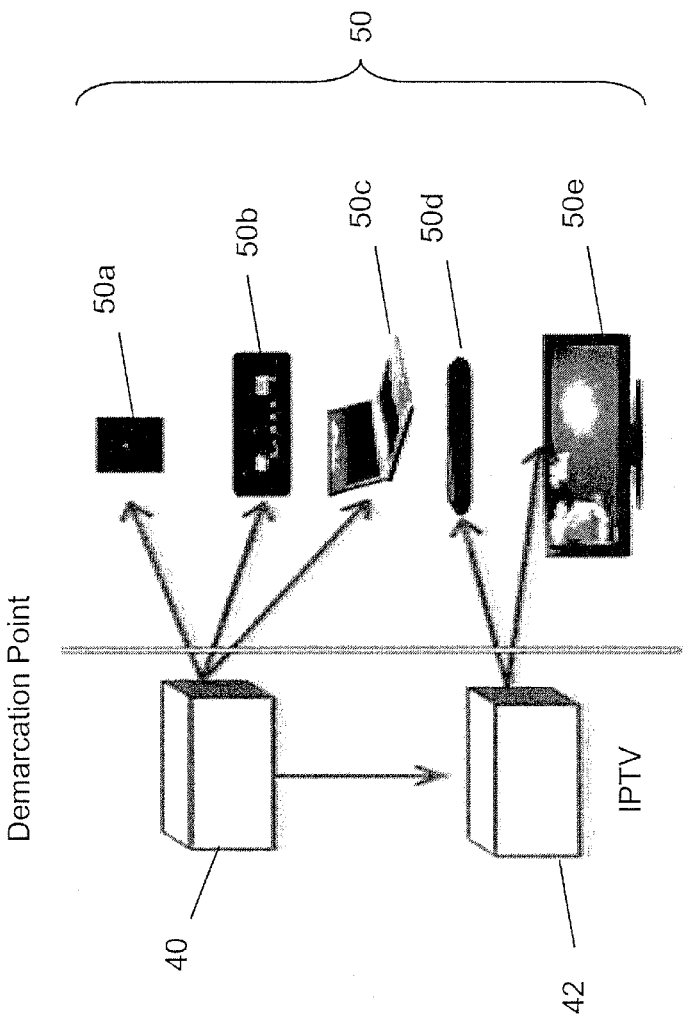
FIG. 2 shows an exemplary system for integrating and distributing media data from a media server across a plurality of different output devices over different delivery networks.

FIG. 2 shows an exemplary system for integrating and/or distributing media data such as audio data, video data, and/or text data to a plurality of different output devices 50 including 50a, 50b, 50c, 50d, 50e such as tablet style personal computers, smart phones, televisions, laptop style personal computers, DVD players, blue ray disk players, etc.

The system shown in FIG. 2 may be implemented by a distributed hardware and/or software architecture comprising a master or master server and one or more slaves. Such a computer architecture is also referred to as a master-slave (or master-multiple slave) architecture. With respect to FIG. 2, the master 40 may be a media server 40 and the slaves 50 may be one or more output devices 50 which are also referred to as local clients 50 (of the media server 40). Hence, a media server 40 may act as the master connected to one or more output devices 50 acting as slaves in the architecture.

The media server 40 may include a high-definition multimedia interface (HDMI). A media server 40 with HDMI may be referred to as an HDMI master 40. HDMI relates to a compact audio/video interface for transmitting uncompressed digital data. HDMI may be operable to connect digital audio and/or video data sources such as set-top boxes, DVD players, HD DVD players, blue-ray disc players, AVCHD camcorders, personal computers (PCs), video game consoles (e.g. PlayStation 3, Xbox 360, Wii U), AV receivers, and/or mobile phones to compatible digital audio devices, computer monitors, video projectors, tablet computers, and/or digital televisions.

In one example, the media server 40 may be connected with an IPTV (Internet Protocol television) system 42 which is connected with one or more 50d, 50e of the output devices 50. IPTV may relate to a system through which television services can be delivered using the Internet Protocol Suite over a packet-switched network such as the Internet.

The media server 40 may receive media data files from the content management system 20, wherein the media data files may be transmitted in the form of a data stream to the media server 40. For example, the media server 40 may interact with the content management system 20 through the management interface 28.

The media server 40 is operable to synchronize and/or re-synchronize media data with the output devices 50, preferably also and/or alternatively through the IPTV system 42. Delivery of media data files to each of the output devices 50 may be implemented by providing a network operated by the media server 40 which is connected to the content management system over a (wired or wireless) network and to the output devices 50 possibly through an IPTV system 42.

In other words, media data files may be transmitted from the media server 40 to the output devices 50 in the form of a data stream over different delivery networks such as pure media data in HDMI, streamed media data over a fixed wired Ethernet network, and/or over a wireless IP network. Hence, the media server 40 is operable to work across a plurality of devices 50 including one or more screens, e.g. via HDMI out, and/or a plurality of output devices 50 including notebooks, tablets, mobile phone devices, smart phones, etc.

The media server 40 may include a media player which may provide the ability to go to full screen playback through a media player and if idle for a time period (e.g. one minute) to go back into full screen playback. The media player may be configured to play a local network media data file, which is uploaded to the content management system 20 and distributed and stored in the media server 40 on a loop. Further, when the media player is started, the media player may load a current play list of media files from the media server 40 in case there has been a change to the play list since the media player last played media files from the play list.

In one aspect, the system shown in FIGS. 1 and 2 is intended to output (e.g. display) media data such as video data, audio data, and/or text data on one or more different output devices 50, wherein the media data is centrally distributed through a media server 40 which is connected with the content management system 20. In one example, the content management system may include functionality to operate as a media server 40 (wired or wireless) connected to one or more output devices 50 possible through an IPTV system 42 for outputting media data synchronously on the output devices 50. In one example, media data is periodically distributed to the output devices 50, e.g. daily, weekly, monthly, etc.

Figure 3:
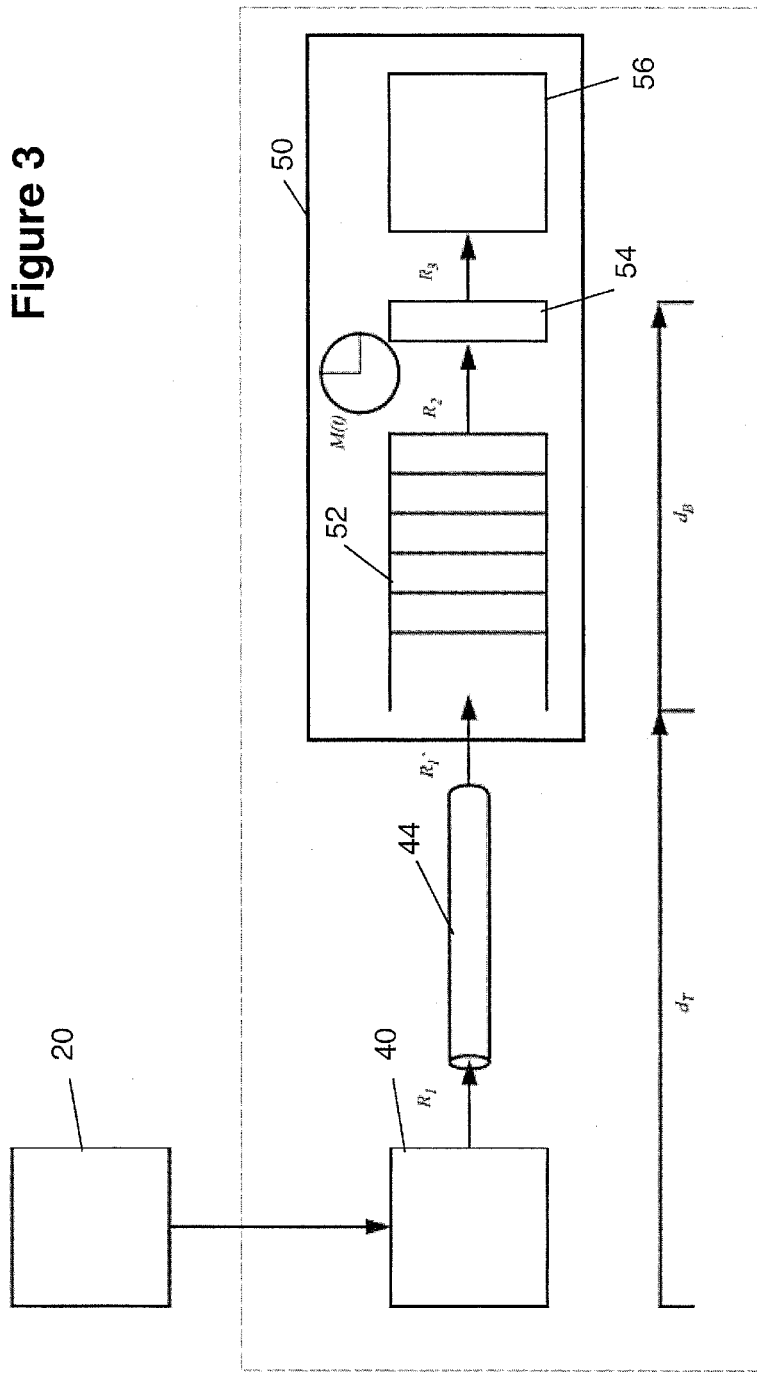
FIG. 3 shows an exemplary system for synchronizing media data distributed to a plurality of different output devices over different delivery networks with a media server.

With reference to FIG. 3, functionality is described to integrate and/or distribute media data retrieved and managed at the content management system 20 from a media server 40 across a plurality of different output devices 50. The output devices 50 may be locally distributed and/or remote from the media server 40. The media server 40 is operable to manage distribution, integration, and/or (re-) synchronization of media data across the output devices 50. The media server 40 may be part of and/or integrated with the content management system 20 or may be separate from the content management system 20. In case the media server 40 is separate from the content management system 20, the media server 40 may interact through a (wired or wireless) network with the content management system 20 through the management interface 28 to upload, download, and/or retrieve media data files from the content management system 20 for distribution and/or integration with the output devices 50.

In other words, an end-to-end delivery of media data to the output devices 50 is provided wherein the delivery of the media data to the output devices 50 from a media server 50 is synchronized. Synchronization may be provided between the output devices 50 themselves and/or of the output devices 50 with the media server 40. Hence, media data is synchronized between the output devices 50 with the media server 40 and will automatically re-synchronize when an incoming stream of media data files is stopped.

For example, a media data file, retrieved from a content management system and hosted by a media server 40, is delivered in the form of a data stream to a plurality of different (output) devices 50. Delivery of media data files to the devices 50 from the media server 40 may be performed over different delivery networks such as pure video in HDMI, IP streamed video over fixed wired Ethernet network, and/or over a wireless IP network. In addition to the delivery of the media data files, output of the media data files is synchronized across the output devices 50 with the media server 40. The synchronization with the output devices 50 may be to a frame accurate level across these different networks. In this way, the same media data is output (e.g. video content is displayed) substantially at the same time on multiple disparate devices 50.

A frame accuracy level may be used to describe video broadcast being deliver to a plurality of output devices to synchronize on a frame level basis. This may be tracked and accomplished via SMPTE timecode. For example in a time code (e.g. an SMPTE timecode) 12:33:34:21, 12 represents the hour of the day, 33 represents the minutes in the hour, 34 represents the seconds in the hour, and 21 represents the number of frames in a second.

However, with the advent of digital media data, achieving this same effect may be difficult since each of the devices may include different characteristics, resolution, processing ability and/or timing. For example, in an on-demand video environment, each video stream could be encoded at different resolutions or frame rates and/or may include multiple video and/or audio data streams embedded within them. For example, in some cases it may be difficult to synchronize the audio data stream with the video data stream on the same device. This synchronization difficulty may be magnified many times by attempting to synchronize multiple media data streams in a wired communications network.

With the synchronization mechanism for synchronizing media data files transmitted from a media server 40 in the form of a data stream to a plurality of different output devices 50 over different delivery networks, the output devices 50 in such a group may be kept (substantially) exactly at the same frame and (substantially) exactly at the same time. Regarding the frames, for example, if the frame rate of a digital video is set to 30 fps (frames per second), than each frame will display for 33 milliseconds.

For example, if there are multiple streams of media data (e.g. a video stream, a first audio stream, a second audio stream), synchronization would be applied to each of the media data streams so that they would all stay synchronized regardless of an output device and/or a transmission method to transmit the data stream to an output device.

In order to synchronize media data output at the output devices 50 at the same frame and at the same time, a Synchronous Stream Protocol algorithm (SSP) is incorporated into the communication between the media server 40 and the output devices 50. The SSP may be implemented using a master—(multiple) slave architecture, wherein the master 40 (e.g. the media server 40) sends out synchronization UDP (User Datagram Protocol) packages to one or more slaves 50 (e.g. the output devices 50). The SSP is described in greater detail below.

UDP is one protocol in the set of network protocols used for the Internet. With UDP, computer applications can send messages, referred to as datagrams, to other computers (also referred to as hosts) on an Internet Protocol (IP) network without requiring prior communications to set up special transmission channels and/or data paths. UDP uses a simple transmission model which is stateless, since UDP assumes that error checking and/or correction is either not necessary or performed in the application, avoiding the overhead of such processing at the network interface level. For time-sensitive applications, UDP might be useful because dropping packets is preferable to waiting for delayed packets, which may not be an option in real-time systems.

The output devices 50 are operable to adjust the playback speed and/or to skip to a particular time in the media data stream based on information received from the media server 40. Each of the output devices is operable to maintain synchronous time with the media server 40 by using a protocol such as the Network Time Protocol (NTP).

For example, in relation to the adjusted playback speed and/or to the skip to a particular time in the media data stream process, the information referenced here and/or received from the media server 40 may include the frame rate of the media data (e.g. a video), wherein the speed may advance the frame rate for example from 29.97/sec to some higher rate (e.g. 33.32/sec) in order to advance the media and/or the time code and/or wherein the skip may provide an output device 50 with information to advance the time. This may be implemented through the communication between the media server 40 and the output devices 50.

The NTP relates to a protocol and a software implementation for synchronizing the clocks of computer systems over packet-switched, variable-latency data networks. NTP may be operable to maintain time to within tens of milliseconds over the public Internet and/or may achieve one millisecond accuracy in local area networks under ideal conditions. NTP provides Universal Time Coordinated (UTC). No information about time zones and/or daylight saving time is transmitted.

A data stream (of media data files) of the media server 40 sends out a UDP message to one, more, or all of the output devices 50 when the data stream enters into an adaptive mode. The adaptive mode computes a target media time at some point beyond the network transmission time. After the adaptive mode has computed the target media time and the media position/frame for the data stream, the computed target media time and the media position/frame are communicated to the output devices 50 in a packet received with the UDP message from the media server 40. Each of the output devices 50 receiving the packet enters a respective adaptive mode. Having entered the respective adaptive mode, the output device 50 adjusts its playback rate of the data stream to coincide with the targeted time and media position/frame received from the media server 40 in the packet of the UDP message.

The target media time may relate to a future time that is deliver by the above adaptive mode method, wherein a start of event such as the top of the hour, the beginning of a new media event, and/or the insertion of a commercial would trigger a time synchronization.

The adaptive mode relates to the ability for a media player of an output device 50 to make changes to the respective data stream such as a bit rate delivered to assist in performance and/or time adjustments.

When a time synchronization between the media server 40 and the output devices 50 is required the time factor can be configured based on skip only or frame rate adjust only. For example, in a Wide Area Network vs. CPU driven synchronization issues, the network would most like require the skip process because large chunks of time can be dealt with quickly, whereby the CPU synchronization issues would drive frame rate adjustments which are smaller and more gradual.

This above described process may be repeated on a configurable duration tuned for a particular environment. Further, the synchronization will be down to a frame by letting the devices 50 account for their own performance lag against two beacons (namely, playback frame position and absolute network time). A beacon may relate to two timing systems that would be used as a reference point for synchronization. NTP (Network Time Protocol) is an example of a beacon, wherein a frame position may be a frame a media data (e.g. a video) is at during a synchronization event and wherein the network time is the reference time of the network broadcasted by a beacon.

With the regard to the SSP which is exemplary illustrated in FIG. 3, a data stream of media data files is produced by a universal media data source such as the content management system 20 and consumed by a location's local media data server such as the media server 40. The media server 40 is responsible for maintaining a synchronized playback of media data file packets received from the system 20 with the output devices 50 by generating data streams either in real time or on demand Data units (also referred to as packets herein) of a data stream are produced with a nominal rate R1 and are transmitted to one or more local clients 50 such as output devices 50 from the media server 40 via an unidirectional transmission channel 44. When transmitting the data stream through the transmission channel 44, the transmission channel 44 may introduce a certain delay and jittery, resulting in a modified arrival rate R1' of the data stream at the output devices 50. At an output device 50, data units of the data stream are buffered in a play-out buffer 52, from which they are released with a release rate R2 for output. The release rate R2, which determines how fast the data stream's presentation advances, is directly controlled by ASP (Adaptive Synchronous Protocol) to manipulate the fill state of the play-out buffer 52 and to ensure synchronization between the media server 40 and the output devices 50 as well as among the output devices 50.

The ASP defines a procedure by which an out of band, low latency communication mechanism is deployed in a single master slave architecture. The master (i.e. the media server 40) will periodically send out UDP messages to the local clients (i.e. the devices 50) comprising a source time, a time in the future, and/or a media position. Having received an UDP message from the media server 40 at an output device 50, the output device 50 adapts its buffer consumption and/or playback rate to adjust for network transmission delays to hit the media position at a specified absolute network time.

The source time may be the synchronization time and may specify a reference time that the (or all) output devices 50 need to follow. The time in the future may relate to a time point in the future but may not necessarily be in respect to something. For example, if in the environment comprising the media server 40 and the output devices 50 there are potential fluctuations of for example 3 second per output device 50, then by the media server 40 a time in the future may be set for 4 seconds and when in one of the output devices 50 a synchronization issue is detected, the (and/or all) output devices 50 are jumped 4 seconds in the media data stream.

Basically, the adaption (or adaptation) may be performed through the adaptive mode. The play-out buffer 52 in the output devices 50 specifies the amount of media data an output device 50 can capture and store before playback can be adjusted as well depending on a level of synchronization required.

A data unit of the data stream which is buffered in the play-out buffer 52 of the output device 50 is released from the play-out buffer 52 at a release rate R2 and is transferred to an s/d-buffer 54 of the output device. The s/d buffer 54 is operable to hold a single data unit only. From this s/d buffer 54, the data unit of the incoming data stream is read by the device 50 with consumption rate R3. The s/d-buffer 54 de-couples the actual consumption rate R3 of the output device 50 from the release rate R2 so as to determine a skipping or duplicating mechanism in the case the release rate R2 differs from the consumption rate R3.

On its way from stream generation to play-out, a data unit of a data stream is delayed at several stages. It takes a data unit a transmission delay dT until it arrives in the play-out buffer 52 at the device 50. This includes all the times for generation, packet creation, network transmission and transfer into the play-out buffer 52. In the play-out buffer 52, the data unit is delayed by a buffering delay dB before it is removed by the device 50. Further, in the device 50, the data unit may experience negligible, further delay before it is actually presented through the display 56 of the device 50.

A media time M(t) specifies a data stream's temporal state of play-out and can be determined by reading the time stamp of the data unit in the s/d-buffer 54 at a time t. The media time may be defined as a partially linear, continuous function M(t), which delivers the media time at real time t in the device 50. The media time may be specified by a time stamp of the data unit or packet and may be implemented and/or specified by an SMPTE time code.

Figure 4:
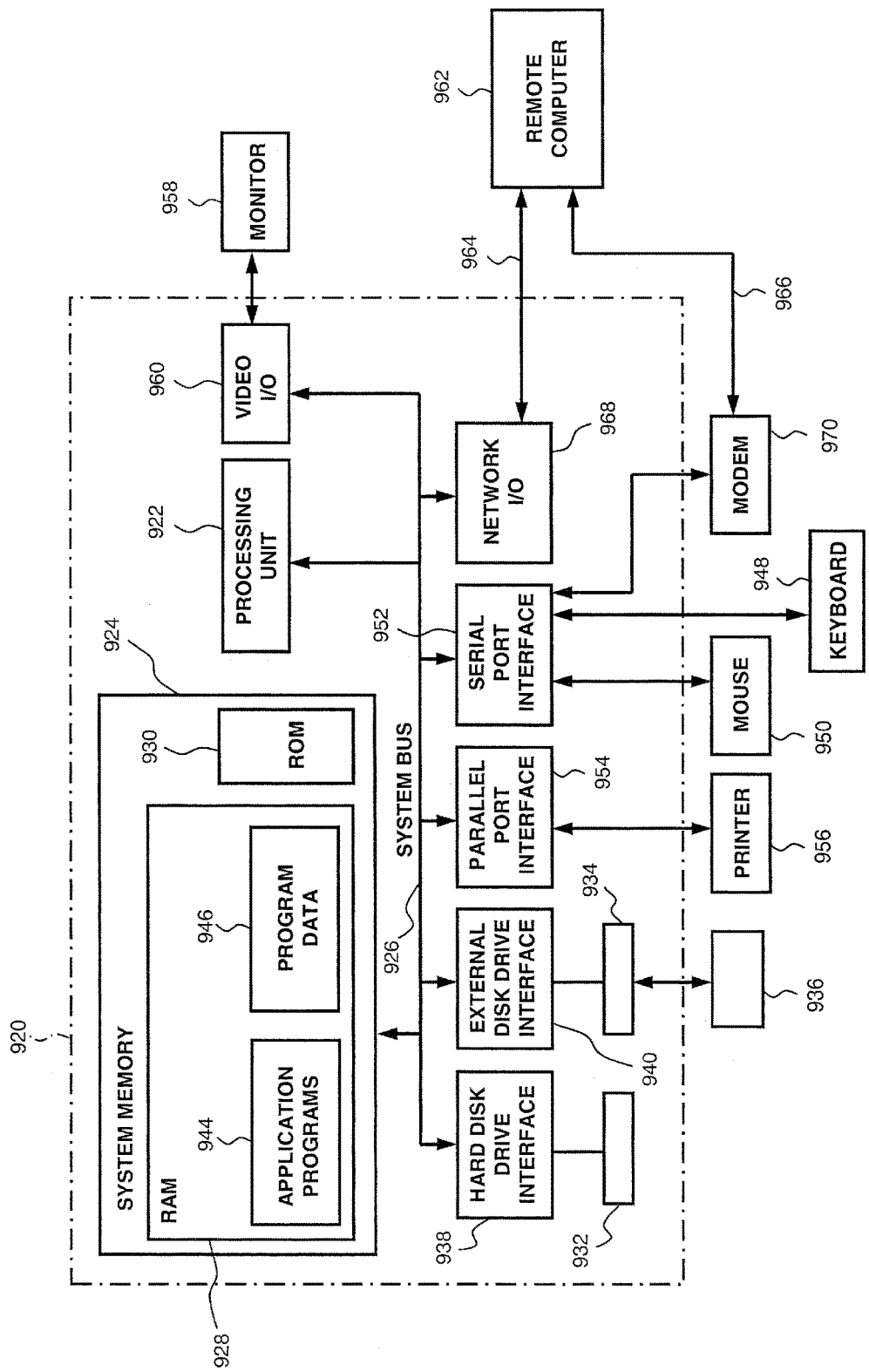
FIG. 4 shows an exemplary computer system and/or computer network system for implementing a computer network, a computer system, and a computer-implemented method as shown in FIGS. 1 to 3.

FIG. 4 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The data structures may include relevant data for the implementation of the method for control of application landscapes, as described above. The relevant data may be organized in a database, for example a relational database management system or an object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 3.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 4 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 4 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for synchronizing media data across a plurality of output devices.

The invention claimed is:

1. A computer-implemented method for synchronizing output of media data across a plurality of output devices, the method comprising:

providing a communication network operated by a media server, the media server being connected to a content management system formatting and storing media data in terms of media data files and a plurality of different output devices, the media server being further connected with an Internet Protocol television system which is connected with one or more of the output devices, the media server comprising a high definition multimedia interface (HDMI), retrieving, by the media server, the media data in the form of media data files from the content management system;

transmitting the media data files from the media server to the plurality of output devices in form of packets of a data stream of media data in HDMI, IP streamed video over fixed wired Ethernet network, and/or over a wireless Internet Protocol network by generating the data stream either in real time or on demand, wherein the media server maintains a synchronized playback of the media data file packets received from the content management system at the plurality of output devices, the synchronized playback comprising playback of the media data files at a same frame and at a same time on each of the output devices;

automatically causing a playback speed for at least one of the plurality of output devices to be adjusted by advancing a frame rate to a higher rate on the at least one of the plurality of output devices as needed per device so that all of the plurality of output devices maintain playback of the media data files at the same frame and at the same time; and computing a target media time and a media position for the data stream relating to a future time;

sending out an User Datagram Protocol (UDP) message comprising the computed target media time and the media position from the media server to each of the plurality of output devices for triggering a time synchronization of the output devices, wherein the target media time is the synchronization time and specifies a reference time that the output devices need to follow when the data stream enters into an adaptive mode.

2. The computer-implemented method of claim 1, wherein a synchronization time with the media server is maintained by each of the plurality of output devices by using a Network Time Protocol of a communication network associated with the media server.

3. The computer-implemented method of claim 1, wherein a Synchronous Stream Protocol (SSP) algorithm is incorporated into a communication network associated with the media server.

4. The computer-implemented method of claim 1, wherein each of the plurality of output devices is operable to adjust a playback speed or to skip to a particular time in the data stream based on information received with the User Datagram Protocol message from the media server.

5. The computer-implemented method of claim 1, wherein the synchronized output of the media data files comprises:
communicating the target media time and the media position to each of the plurality of output devices, wherein the adaptive mode determines the target media time at a time point beyond a network transmission time and the media position in the communication network.

6. A computer program product comprising a non-transitory storage medium having stored thereon computer readable instructions, which when loaded and run in a computer processor of a media server, cause the processor to:
provide a communication network operated by the media server, the media server being connected to a content management system formatting and storing media data in terms of media data files and a plurality of different output devices, the media server being further connected with an Internet Protocol television system which is connected with one or more of the output devices, the media server comprising a high definition multimedia interface (HDMI);
retrieve by the media server, the media data in the form of the media data files from the content management system;
transmit the media data files from the media server to the plurality of output devices in form of packets of a data stream of media data in HDMI, IP streamed video over fixed wired Ethernet network, and/or over a wireless Internet Protocol network by generating the data stream either in real time or on demand, wherein the media server maintains a synchronized playback of the media data file packets received from the content management system at the plurality of output devices, the synchronized playback comprising playback of the media data files at a same frame and at a same time on each of the output devices;

automatically cause a playback speed for at least one of the plurality of output devices to be adjusted by advancing a frame rate to a higher rate on the at least one of the plurality of output devices as needed per device so that all of the plurality of output devices maintain playback of the media data files at the same frame and at the same time; and compute a target media time and a media position for the data stream relating to a future time; and send out an User Datagram Protocol (UDP) message comprising the computed target media time and the media position from the media server to each of the plurality of output devices, wherein the target media time is the synchronization time and specifies a reference time that the output devices need to follow when the data stream enters into an adaptive mode.

7. The computer program product of claim 6, wherein a synchronization time with the media server is maintained by each of the plurality of output devices using a Network Time Protocol.

8. The computer program product of claim 6, wherein during the adaptive mode, the media data of the plurality of data streams is transmitted by the media server over the different networks at varying bit rates to accommodate network and device performance.

9. The computer program product of claim 8, wherein each of the plurality of output devices is operable to adjust a playback speed or to skip to a particular time in the data stream based on information received with the User Datagram Protocol message from the media server.

10. The computer program product of claim 6, wherein synchronously outputting the media data files comprises:
communicating the target media time and the media position to each of the plurality of output devices, wherein the adaptive mode determines the target media time at a time point beyond a network transmission time and a media position.

11. A computer system for synchronizing output of media data across a plurality of output devices comprising:
a media server;
a plurality of output devices; and
a content management system that formats and stores media data in the form of media data files;
in a communication network operated by the media server, the media server being connected to the content management system that formats and stores media data in terms of media data files and a plurality of different output devices, the media server being further connected with an Internet Protocol television system which is connected with one or more of the output devices, the media server comprising a high definition multimedia interface (HDMI);
retrieve by the media server, the media data in the form of the media data files from the content management system;
transmit by the media server the media data files by the media server to the plurality of output devices in the form of packets of a data stream of media data in HDMI, IP streamed video over fixed wired Ethernet network, and/or over a wireless Internet Protocol network by generating the data stream either in real time or on demand, wherein the media server maintains a synchronized playback of the media data file packets received from the content management system at the plurality of output devices, the synchronized playback comprising playback of the media data files at a same frame and at a same time on each of the plurality output devices;

automatically cause by the media server a playback speed for at least one of the plurality of output devices to be adjusted by advancing a frame rate to a higher rate on the at least one of the plurality of output devices as needed per device so that all of the plurality of output devices maintain the playback of the media data files at the same frame and at the same time;

compute by the media server a target media time and a media position for the data stream relating to a future time; and send out an User Datagram Protocol (UDP) message comprising the computed target media time and the media position from the media server to each of the plurality of output devices, for triggering a time synchronization of the output devices wherein the target media time is the synchronization time and specifies a reference time that the output devices need to follow when the data stream enters into an adaptive mode.

12. The computer system of claim 11, wherein a synchronization time with the media server is maintained by each of the plurality of output devices using a Network Time Protocol.

13. The computer system of claim 11, wherein a Synchronous Stream Protocol (SSP) algorithm is incorporated into a communication network associated with the media server.

14. The computer system of claim 11, wherein each of the output devices is operable to adjust a playback speed and/or to skip to a particular time in the data stream based on information received with the User Datagram Protocol message from the media server.

15. The computer system of claim 11, wherein the media data files are synchronously output by communicating the target media time and the media position to each of the plurality of output devices, wherein the adaptive mode determines the target media time at a time point beyond a network transmission time and a media position.

* * * * *